(12) United States Patent
Glad

(10) Patent No.: US 6,619,484 B1
(45) Date of Patent: Sep. 16, 2003

(54) FILTER DEVICE

(75) Inventor: Håkan Glad, Åsa (SE)

(73) Assignee: AstraZeneca AB, Sodertalje (SE)

( * ) Notice: Subject to any disclaimer, the term of this patent is extended or adjusted under 35 U.S.C. 154(b) by 87 days.

(21) Appl. No.: 09/623,157

(22) PCT Filed: Jul. 13, 2000

(86) PCT No.: PCT/SE00/01487
§ 371 (c)(1),
(2), (4) Date: Aug. 25, 2000

(87) PCT Pub. No.: WO01/03809
PCT Pub. Date: Jan. 18, 2001

(30) Foreign Application Priority Data

Jul. 14, 1999 (SE) .............................. 9902697

(51) Int. Cl.⁷ ................................. B07B 9/00
(52) U.S. Cl. ..................... 209/23; 209/29; 209/142; 209/714
(58) Field of Search ............... 209/21, 22, 23, 209/28, 29, 142, 143, 713, 714

(56) References Cited

U.S. PATENT DOCUMENTS

| 1,735,479 A | * | 11/1929 | Sturtevant ............ 209/29 X |
| 3,262,573 A | | 7/1966 | Schutte ............... 210/380 |
| 4,051,603 A | | 10/1977 | Kern, Jr. ............. 34/57 A |
| RE32,307 E | | 12/1986 | Glatt et al. ........... 366/102 |
| 5,106,488 A | * | 4/1992 | Jonasson .............. 209/23 X |
| 5,444,892 A | | 8/1995 | Ris et al. ............. 15/304 |
| 5,713,972 A | | 2/1998 | Snyder, Sr. ........... 55/317 |
| 5,766,281 A | | 6/1998 | Luy et al. ............. 55/242 |
| 5,845,782 A | * | 12/1998 | Depew ................ 55/302 X |
| 5,976,224 A | * | 11/1999 | Durant et al. ......... 209/714 X |

FOREIGN PATENT DOCUMENTS

| DE | 816051 | * | 7/1949 | ........... 209/23 |
| DE | 2433934 | | 2/1976 | |
| EP | 572356 | | 12/1993 | |
| EP | 870526 | | 10/1998 | |

* cited by examiner

Primary Examiner—Tuan N. Nguyen
(74) Attorney, Agent, or Firm—White & Case LLP

(57) ABSTRACT

The present invention relates to a filter device, especially for a fluidized bed system and particularly for use in the pharmaceutical industry, for separating particles larger than a separating grain from an amount of particles in a fluid flow. The filter device includes a housing and at least one filter portion. A part of the housing is mounted for rotational movement, and the filter portion is provided in the housing, whereby the filter portion is movable upon rotation of the housing. The present invention also relates to a method for separating particles using such a filter device.

29 Claims, 5 Drawing Sheets

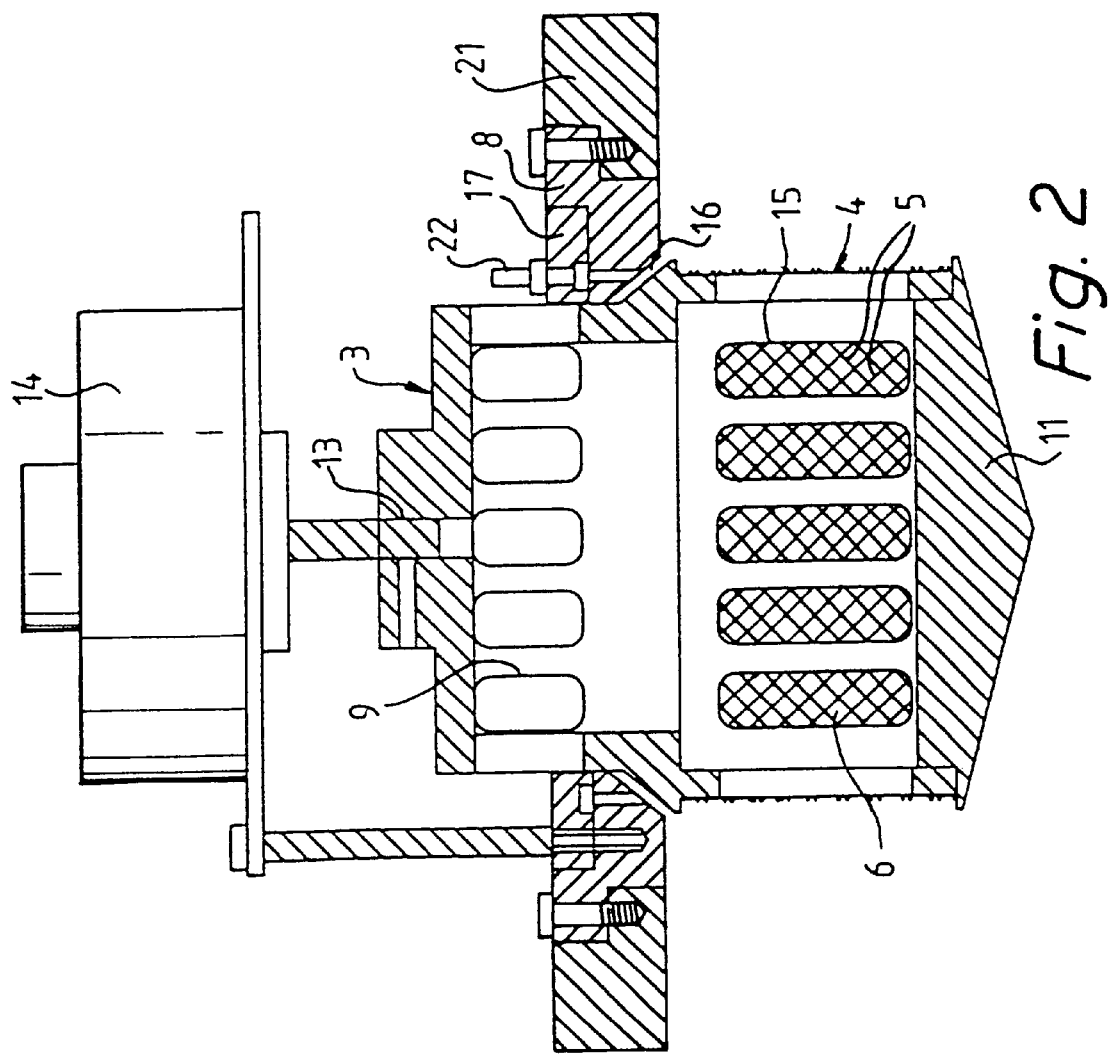

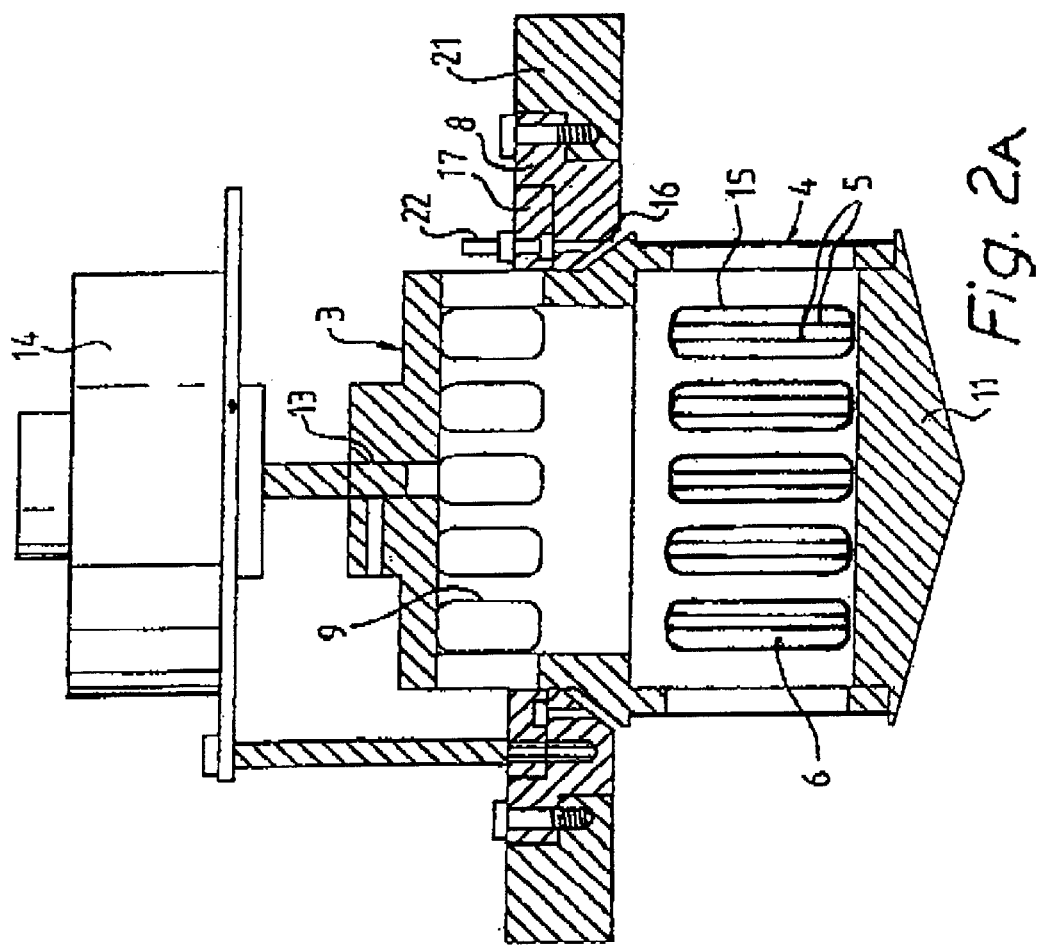

FILTER DEVICE

TECHNICAL FIELD OF THE INVENTION

The present invention relates to a filter device especially for a fluidised bed system, particularly for use in pharmaceutical industry, for separating particles being larger than a separating grain from an amount of particles in a fluid flow. The filter device comprises a housing and at least one filter portion. The invention also relates to a method for separating particles using such a device.

BACKGROUND ART

In the area of particle formation, coating and granulation it is well known to use different techniques involving a fluidised bed apparatus. Basically, fluidisation is the operation by which solids are transformed into a fluid like state through suspension in a gas or liquid. If a fluid is passed upward through a bed of fine particles at a certain velocity, the frictional force between particles and fluid will just counterbalance the weight of the particles. In this state, the vertical component of the compressive force between adjacent particles disappears, and the pressure drop through any section of the bed about equals the weight of fluid and particles in that section. At this fluid velocity, the bed is just fluidised. Higher fluid velocities might lead to states where the fluid for example forms bubbles or gives rise to a turbulent motion in the solids. At even higher velocities, the fluid will entrain solids out of the bed and bring them along in its upward motion. The term fluidised bed is used when referring to different kinds of such beds.

When the fluid in a fluidised bed entrains large amounts of solid particles, a steady state can be achieved by collecting the entrained particles and returning them to the bed. Up to a certain amount of entrainment, a cyclone that is provided inside the vessel carrying the fluidised bed can provide the necessary collection and re-entry of particles for retaining steady state conditions in the vessel. Such a system is often referred to as a fluid bed. When bigger cyclone collectors must be provided outside the bed, such a system is often called a fast fluidised bed. Both these systems are circulating fluidised beds, and they are thus useful in different processes for particle treatment, as the particles will circulate several times in the system.

Within the pharmaceutical industry, fluidised beds are often used for granulation or coating of a product. Granulation is typically performed by spraying droplets of a liquid on particles, which are kept in the fluidised state. The particles will then tend to stick together, agglomerate, either by means of a binding agent in said liquid, or by a slightly dissolving effect from said liquid. Coating is usually performed by spraying a solution of coating agents onto the particles. In both granulation and coating processes it is important that conditions, such as the temperature, are such that the agglomerates or coatings will dry quickly enough so that unwanted agglomeration will not appear. On the other hand if drying of the agglomerates or coatings happens too quickly, unwanted spray drying of the material might appear.

An application of a circulating fluidised bed is described in the document U.S. Pat. No. 4,051,603, Kern, Jr. The fluidised bed apparatus revealed comprises a container wherein a fluidised bed is arranged. The particles are disposed above a perforated plate through which the fluid, in this case hot air, is allowed to pass. The entrained particles in the resulting fluidised bed are subjected to coating by means of a nozzle extending into the container and from which coating material is sprayed. The entrained particles and the fluid are sucked into a cyclone separator. The cyclone separator is provided in connection to the container and arranged to re-enter the entrained particles to the fluidised bed, and to lead off the remaining fluid. The particles will thus circulate from the bed to the separator and back. Each time a particle passes the nozzle, it will be sprayed with coating material and thus grow in size and weight. At a certain weight, the particle will be too heavy to be entrained with the fluid. Instead, it will fall down through the fluidised bed and be collected there. The process could of course be interrupted prior to that any particles reach such a size, and the particles collected directly from the bed. This kind of apparatus may be used for granulation instead of coating of particles. A granulation liquid will then be sprayed from a nozzle instead of a coating material.

The function of a cyclone separator is based on the action of centrifugal forces. These forces are produced by accelerating the fluid with the entrained particles onto a circular track provided around a vertical cyclone axis. The centrifugal force acting on each particle will increase with increasing particle size, so that larger particles will be flung against the wall of the separator and slide downwards to an outlet, which in this case would open towards the fluidised bed. Smaller particles will follow the fluid flow all through the separator and usually leave the cyclone through an opening in the separator ceiling. The specific grain size at which the particles start to separate from the fluid is often called the separating grain. The dimensions of the cyclone as well as what kind of fluid or particles used will be some of the parameters affecting the size of the separating grain.

Cyclone separators are widely used, although showing several disadvantages. Unevenly distributed coating on the particles may appear because of the swirls that will occur in the gas flow when passing the cyclone. Furthermore, the efficiency of a cyclone separator is low when separating very small particles, such as dust of spray-dried material from the coated/granulated-particles. The dimensions of a specific cyclone offer only one separating grain, resulting in a narrow fraction of separated particles. Recycling must always be provided.

To avoid the problems related to the cyclone separators commonly used, several other devices have been proposed. In the document EP-B1-0 572 356 a fluidised bed apparatus is described provided with at least one vertical cartridge filter projecting into the fluidised bed container. The filter has a fabric filtration member, i.e. comprising a textile fabric. When such a filter has collected a certain amount of small particles, it must be cleaned unless the fluid flow through the filter will be severely restricted. In this case the filter is washed with a liquid cleaning agent. The filter is pushed upwards and out of the container in order to be washed. This is time-consuming and interrupts the operation of the fluid bed apparatus. In other documents, for example U.S. Pat. No. 5,766,281, Luy et al. and US-RE32 307, Glatt et al, different cleaning procedures are proposed, such as gas cleaning combined with wet cleaning or vibration cleaning of the filters. Filtration members made by paper or textile fabric have an additional disadvantage in that they have low strength and therefore they might be damaged when cleaned or blown out.

Particles clogging in the filter structure are a problem, which gives rise to the need of cleaning the filters. This is especially pronounced when dealing with small solid particles, such as unwanted dust of excess spray-dried material. Even if cleaning sometimes can be made during operation of the process, the fluid flows will be disturbed, and the overall efficiency will be decreased.

Other known techniques for particle separation are deflectors or fixed nets. For a fixed net, the separating grain is always decided by the mesh size, and problems with particles clogging the net do usually appear. The use of deflectors in for example a fluid passage can not be used for separating very small particles, since these will continue the travel in the passage along with the fluid. An additional end filter is therefore required for filtering off small particles.

SUMMARY OF THE INVENTION

The aim of the present invention is to provide a filter device for a fluidised bed system, especially but not exclusively for use in pharmaceutical industry, which do not have the above mentioned disadvantages. It is also an aim to provide a filter device with a separating grain that can easily be varied.

This aim is reached by a filter device, especially for a fluidised bed system and particularly for use in pharmaceutical industry, for separating particles being larger than a separating grain from an amount of particles in a fluid flow, said filter device comprising a housing and at least one filter portion, characterised in that a part of said housing is mounted for rotational movement, and that said filter portion is provided in said housing, whereby the filter portion is movable upon rotation of said housing. The fluidised bed system comprises a fluidised bed vessel for carrying out a coating, granulation or drying process, and conduits leading to and from the fluidised bed vessel containing fluid and particles to be separated.

The term "separating grain" does herein refer to the size of the smallest particle that does not pass the filter device, and could be regarded as a measure of the limit of separation for said filter device. The separating grain will be determined by the mesh size of the filter portion and by the velocity of the filter portion. By varying the speed of rotation of the filter portion, the separating grain can thus be varied using only one separating system, which eliminates the need of different filters for separating particles of different sizes. Normally, the separating grain can have a range of 10–500 microns.

Typically, the separating grain will be 50 microns, i.e. particles smaller than 50 microns will pass through the filter device and thus, all particles larger than 50 microns will stay in the fluidised bed system.

The filter is kept clean and free from clogging of particles, because of the rotational motion creating centrifugal forces on the particles. Thus, no interruptions of the process for maintenance and cleaning of the filter are necessary. With the device according to the invention, satisfactory results have been achieved even when separating small particles, usually smaller than 50 microns, such as dust consisting of spray-dried material in a fluidised bed coating process.

The housing could for example be formed like a drum, which is mounted to be rotationally movable. The filter portion is then advantageously disposed at the circumference of said drum. The drum shape has the advantage that the filter device can easily be maintained at a constant rotational speed. The centrifugal forces created also contribute to keep the filter portion clean from particles. Besides, a large active area covered with the filter portion can be used.

Preferably, the filter portion comprises several filter members arranged in such a way that interstices are formed between said filter members. The filter portion is movable upon rotation of the housing in a direction intersecting at least a plurality of said filter members. The separating grain will be determined by the size of the interstices between the filter members and by the velocity of the filter portion in the rotational direction.

The probability of a particle to be stopped by the filter portion increases as the rotational velocity of the housing increases. This is due to the fact that the direction of rotation intersects at least some of the filter members of the filter portion. Further, due to the probability of a particle to be stopped by a filter member, particles that are actually smaller than the interstices could also be hindered by the filter system if an appropriate rotational velocity is chosen.

The filter portion is preferably provided inside a vessel, i.e. a fluidised bed vessel that initially contains the fluid and the particles to be separated. The housing holding the filter portion is preferably extending through the vessel, whereby a first part comprising the filter portion is mounted inside the vessel and a second part, mounted outside of the vessel is provided with at least one fluid outlet. The fluid enters through the filter portion, passes through the housing and out via the fluid outlet. Particles smaller than the separating grain will follow the fluid all the way through the housing and out via the fluid outlet. Larger particles will stay in the vessel, where they will continuously be subjected to continued coating or granulation processes. The rotating filter portion will fling the larger particles from the filter and spread them in the vessel.

The filter portion may also be provided in conduits leading to or from the vessel. By providing such conduits with the filter device clogging of the conduits can be prevented.

Advantageously, the housing carrying the filter portion is detachably arranged in a filter holder means. Such holder means can be disposed in the wall of a reaction vessel, through which the fluid with entrained particles is allowed to pass, or for example in a conduit forming a passage for said fluid. The fluid could be for example a liquid, a gas or a super-critical fluid.

Advantageously, the housing also comprises first and second body parts that are detachably interconnected. By separating the first and second body part, easy cleaning between batches or sterilising of the filter device is possible if necessary.

Preferably the filter device is provided with connector means for connection to a motor unit. Advantageously, the speed of the motor unit is variable for variation of the rotational velocity of the filter portion during operation of the filter device for obtaining the desired separating grain.

Preferably an open space is defined between the housing and the filter holder means, through which open space fluid pressure is provided, constituting a fluid seal between the housing and the filter holder means. The fluid pressure will keep the open space free from particles, and thus ensure a smooth movement of the filter device.

The invention also comprises a method for separating particles, especially for a fluidised bed system and particularly for use in pharmaceutical industry.

BRIEF DESCRIPTION OF THE DRAWINGS

FIG. 2 shows the embodiment of FIG. 1, with the fluidised bed and the casing removed for clarity.

FIG. 2A shows an alternative embodiment of FIG. 2 in which the filter portion comprises elongate filter members which are bars arranged in parallel.

DETAILED DESCRIPTION OF THE PREFERRED EMBODIMENTS OF THE INVENTION

Figure 1:
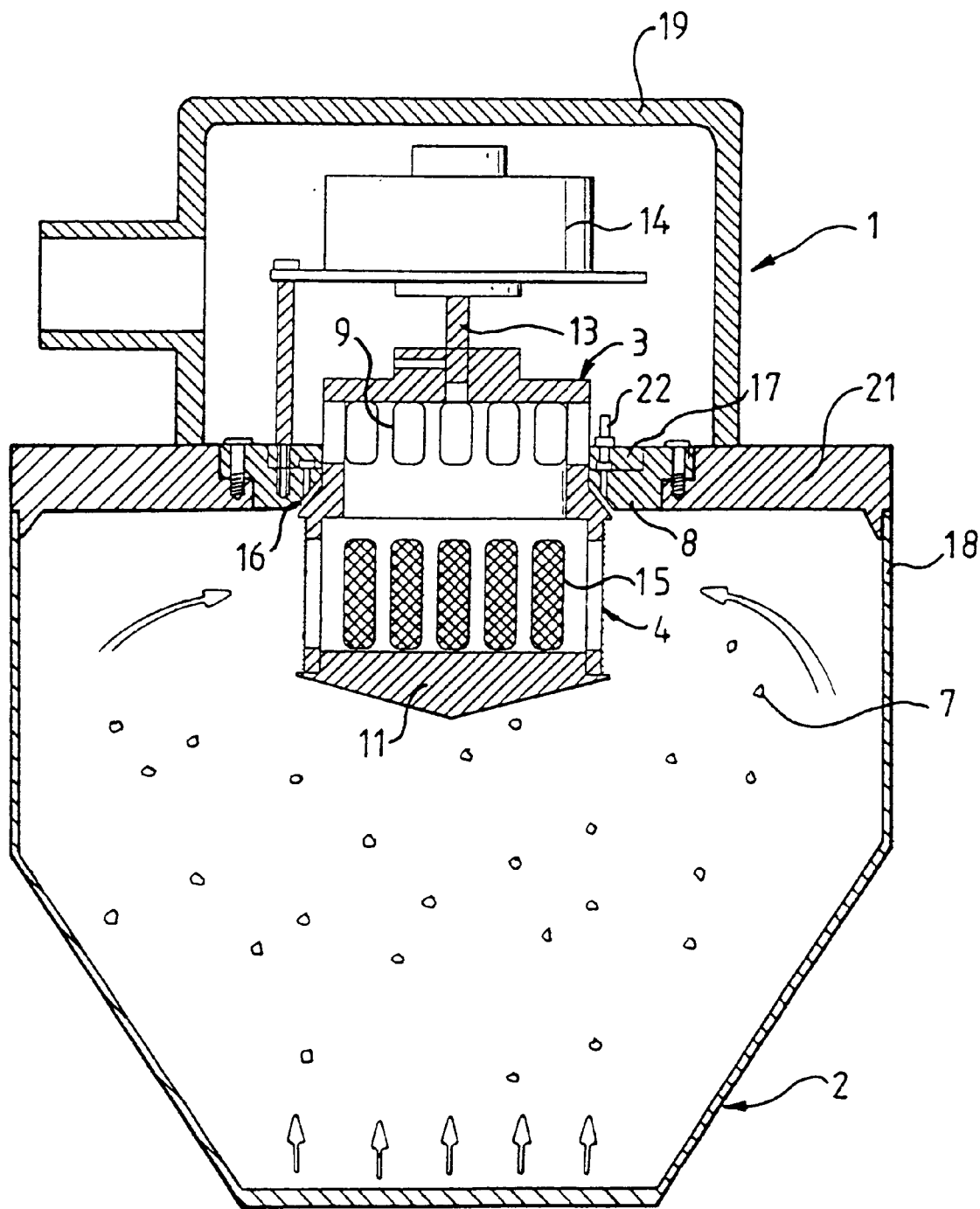
FIG. 1 shows schematically an embodiment of a filter device according to the invention in use in a fluidised bed system.

A preferred embodiment will now be described by way of example only. In FIG. 1 a filter device 1 according to the invention is shown in use in a fluidised bed system 2. In the fluidised bed system 2, particles 7 of different sizes are entrained by the fluid flow (schematically shown with arrows). The filter device 1 comprises a housing 3 arranged in a filter holder means 8 that is supported by a lid 21 constituting the ceiling of a fluidised bed vessel 18. The lid 21 is provided with an aperture to sealingly receive the filter holder means 8. A casing 19 is provided surrounding the outer part of the housing 3, said casing is provided with an outlet passage for leading of the fluid and small particles which have been able to pass the filter device 1.

Figure 3:
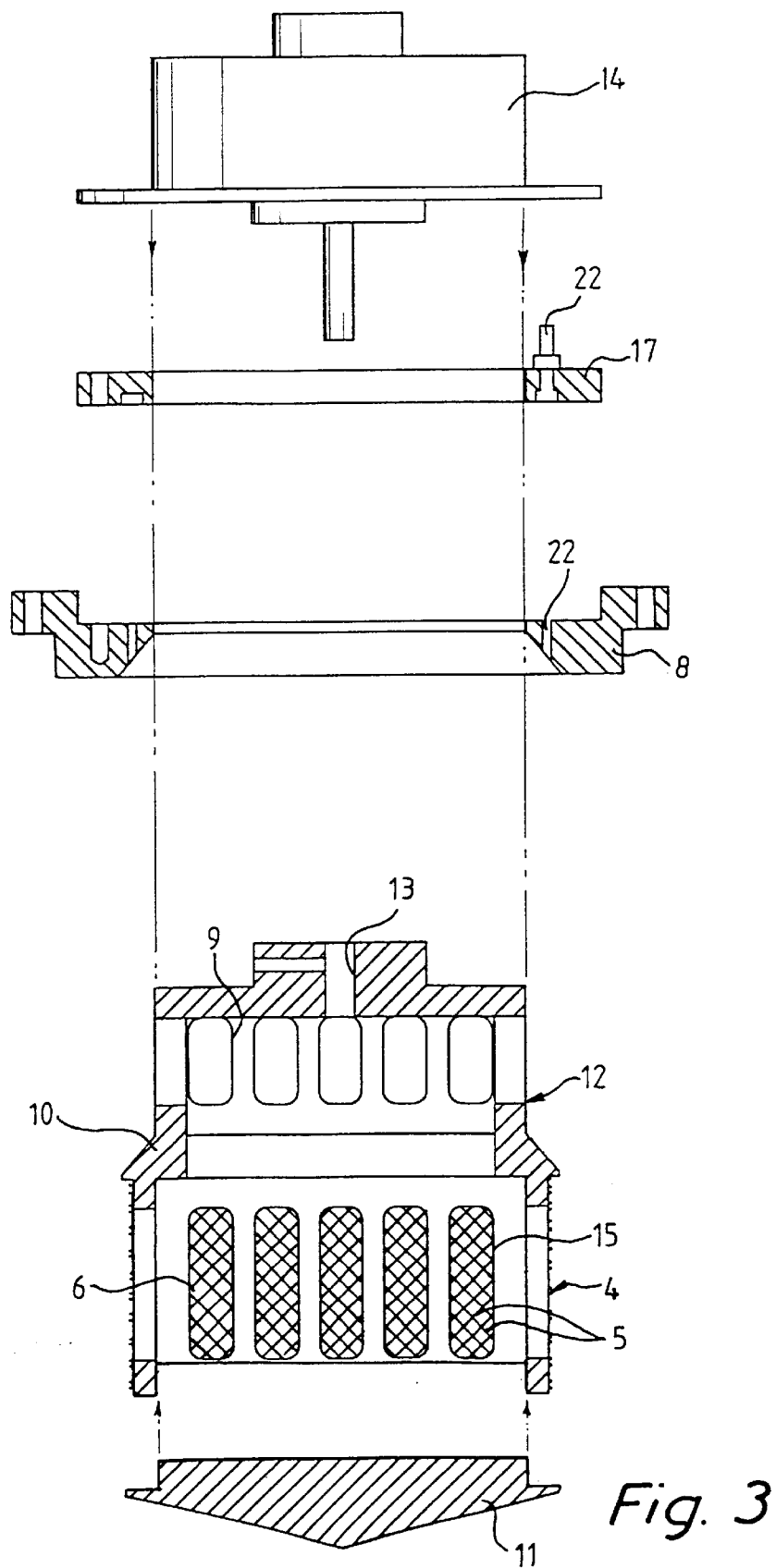
FIG. 3 is an exploded view of the filter device in FIG. 2.

As could be seen in FIGS. 2–3, the filter holder means 8 supports an adjuster element 17 by which the positioning of the housing 3 can be altered. The housing 3 is connected to a motor 14 via connector means 13. Preferably, the housing 3 is drum shaped and designed to be rotated around its central axis. It further extends on both sides of the filter holder means 8. The inner part of the housing 3 is provided with filter inlet openings 15 where the fluid enters the filter device, and the outer part of the housing 3 is provided with filter outlet openings 9 for letting out the fluid flow. FIG. 2A shows an alternative embodiment of FIG. 2 in which the filter portion comprises elongate filter members which are bars arranged in parallel.

Figure 5:
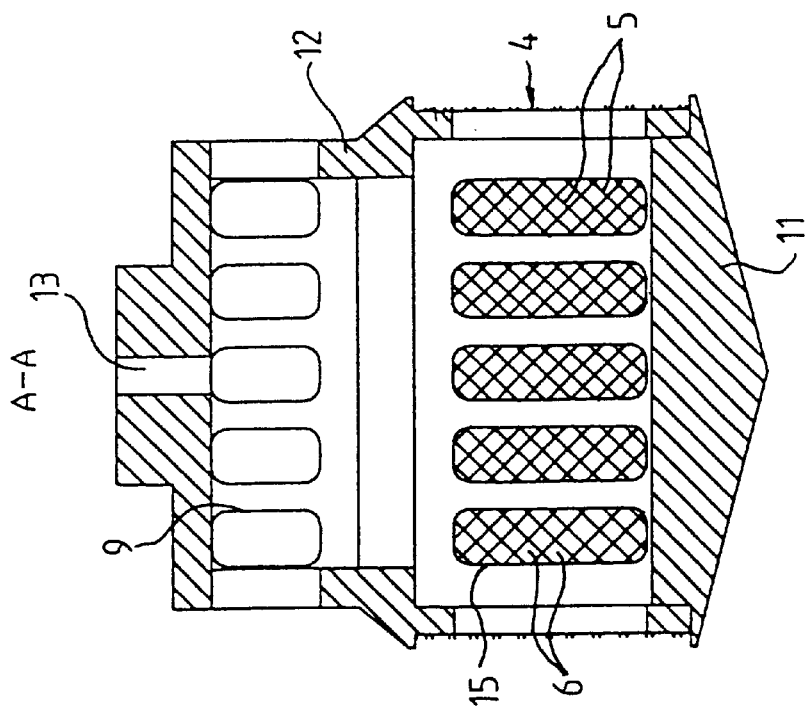
FIG. 5 is a transversal view through line A—A of FIG. 4.
Figure 4:
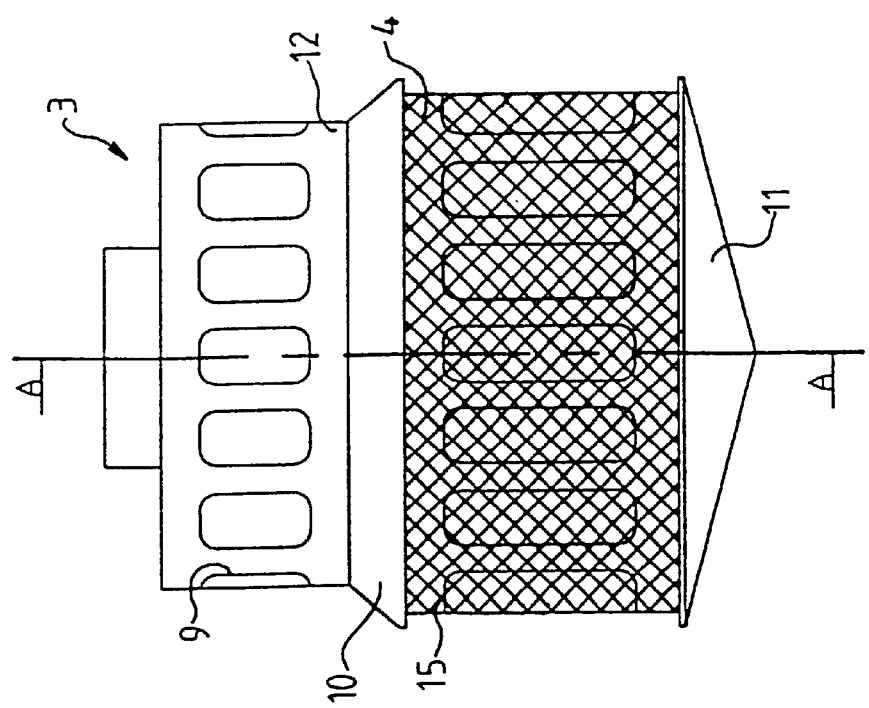
FIG. 4 is a side view of the housing of the embodiment of the present invention in FIG. 1.

In this embodiment, shown in FIGS. 4–5, the inlet openings 15 are covered by a filter portion 4, which is constituted by a mesh. The threads of the mesh provide the filter members 5, and between the threads interstices 6 are defined. For accomplishing the necessary filtration, separation of particles, the filter device is rotated by means of the motor 14. The fluid is drawn into the filter device through the inlet openings 15. The probability of a large particle intersecting a thread when encountering the rotating mesh is rather large. Thus larger particles cannot pass the filter but will stay in the fluidised bed system. Small particles as spray-dried material will on the contrary pass through the interstices 6 in the filter portion 4, and thus the filter device provides an effective separation unit.

The filter portion 4 is preferably made out of a relatively soft material such as Teflon® or Nylon A harder material, such as steel, could be to abrasive against the particles impinging, on the filter members 5 and cause grinding. A advantage with the above-mentioned materials is their smoothness, which causes the particles to slide over the filter portion, which makes clogging of particles to the filter improbable.

The fluid will pass out of the filter device through outlet openings 9 provided in the housing. Preferably, the inlet openings 15 and the outlet openings 9 are uniformly distributed along the circumference of the housing 3. Such a configuration will provide a more evenly distributed fluid flow.

An open space 16 is defined between the housing 3 and the filter holder means 8. Through space 16 an air pressure is provided through fluid inlets 22. These inlets 22 are evenly distributed along the adjuster means 17 and correspondingly along the filter holder means 8. Thus, the air provided through these fluid inlets provides an efficient fluid seal between the housing 3 and the filter holder means 8. This prevents particles from clogging in the open space 16 and an easy rotation of the filter device is maintained.

The housing 3 is provided with a collar 10 for detachably connection to the filter holding means 8. Further, the housing 3 is constituted by a first body part 11 and a second body part 12 which are detachably interconnected. This is an advantage if cleaning is performed between batches or when sterilising the filter device 1. In this particular embodiment, the first body part 11 is shaped as a cone pointing into the inner of the fluid bed vessel 18. The cone shape has shown to be useful since it prevents clogging of spray material to the first body part 11. Such clogging might appear for example if a nozzle for supplying coating material is disposed essentially aligned with the first body part 11. Clogging is in this case highly probable when using a flat first body part 11.

Several other embodiments are possible within the scope of the invention. Instead of a mesh, the filter members 5 can be elongated bars organised in parallel to constitute a filter portion 4 with interstices 6 between the bars. The direction of motion of the filter portion 4 must in this case intersect the bars. The design of the filter housing 3 can be made different, as regards the in- and outlet openings (15, 9).

In the described embodiment, the rotating housing 3 is provided with fluid outlets 9. Another possible configuration is a housing 3 consisting of several parts, where only the part supporting the filter portion 4 is rotating. The other part, which may be provided with the fluid outlets 9, might then be fixed.

A plurality of filter devices can be arranged adjacently or in connection to each other. Several filters with different separating grain can also be arranged in series to make separation of very small particles possible. The size of the interstices 6, and thus of the mesh, can be chosen so that all of the particles entrained in the fluid flow can pass through a single interstice, if the filter portion is not rotating.

What is claimed is:

1. A filter device for a fluidised bed system for separating particle s larger than a separating grain from an amount of particles in a fluid flow, the filter device comprising a housing and at least one filter portion sized and configured for separating the particles based upon the size of the particles, wherein a part of the housing is mounted for rotational movement, and the filter portion is provided in the housing and movable upon rotation of the housing, and wherein the housing defines a plurality of equally spaced filter outlet openings for withdrawal of the fluid and particles that have passed the filter portion.

2. The filter device according to claim 1, wherein said part of the housing is in the shape of a drum.

3. The filter device according to claim 2, wherein the filter port on is disposed at the circumference of the drum.

4. The filter device according to claim 1, wherein the filter portion comprises several filter members arranged such that interstices are formed between the filter members.

5. The filter device according to claim 4, wherein the filter portion is movable upon rotation of the housing in a direction intersecting at least a plurality of the filter member, whereby the separating grain of the filter device is determined by tite velocity of motion of the filter portion in the direction of movement during operation of the filter device and by the size of interstices between the filter members.

6. The filter device according to claim 1, wherein the filter portion is provided in a conduit in connection with the vessel forming a passage for the fluid and the particles to be separated.

7. The filter device according to claim 1, wherein the housing is detachably arranged in a filter holder means.

8. The filter device according to claim 1, wherein the housing defines a plurality of equally spaced filter inlet openings, and each opening is covered by a filter portion.

9. A filter device for a fluidised bed system for separating particles larger than a separating grain from an amount of particles in a fluid flow, the filter device comprising a housing and at least one filter portion sized and configured for separating the particles based upon the size of the particles, wherein:

the housing comprises a first part and a second part which extend on the sides of the vessel, and the first part comprising the filter portion is mounted inside the vessel and the second part is mounted outside the vessel and provided with at least one fluid outlet;

a part of the housing is mounted for rotational movements; and the filter portion is provided in the housing inside a vessel that initially contains the fluid and the particles to be separated and is movable upon rotation of the housing.

10. The filter device according to claim 9, wherein said part of the housing is in the shape of a drum.

11. The filter device according to claim 10, wherein the filter portion is disposed at the circumference of the drum.

12. The filter device according to claim 9, wherein the filter portion comprises several filter members arranged such that interstices are formed between the filter members.

13. The filter device according to claim 12, wherein the filter potion is movable upon rotation of the housing in a direction intersecting at least a plurality of the filter members, whereby the separating rain of the filter device is determined by the velocity of motion of the filter portion in the direction of movement during operation of the filter device and by the size of interstices between the filter members.

14. The filter device according to claim 9, wherein the filter portion is provided in a conduit in connection with the vessel forming a passage for the fluid and the particles to be separated.

15. The filter device according to claim 1, wherein the housing is detachably arranged in a filter holder means.

16. The filter device according to claim 15, wherein the housing is provided with a collar for detachable connection to the filter holder means.

17. The filter device according to claim 9, wherein the housing comprises first and second body parts which are detachably interconnected.

18. The filter device according to claim 9, wherein the housing is provided with connector means for connection to a motor unit.

19. The filter device according to claimed 18, wherein the speed (of the motor unit can be adjusted to vary the rotational velocity of the filter portion during operation of the filter device for obtaining the desired separating grain.

20. The filter device according to claim 12, wherein the filter portion comprises a mesh, and the filter members are the threads of the mesh.

21. The filter device according to claim 12, wherein the filter portion comprises elongated filter members, which are bars ranged in parallel.

22. The filter device according to claim 12, wherein the interstices between the filter members is larger than each of the particles in the fluid flow.

23. The filter device according to claim 9, wherein the housing defines a plurality of equally spaced filter inlet openings, and each opening is covered by a filter portion.

24. The filter device according to claim 9, wherein the housing defines a plurality of equally spaced filter outlet openings for withdrawal of the fluid and particles that have passed the filter portion.

25. The filter device according to claim 15, wherein an open space is defined between the housing and the filter holder means, to which open space fluid pressure is provided which constitutes a fluid pressure seal between the housing and the filter holder means.

26. The filter device according to claim 26, wherein the width of the open space is varied by means of an adjuster element provided adjacent to the filter holder means.

27. A method for separating particles larger than a separating grain from an amount of particles in a fluid flow, comprising passing the fluid flow through a filter device according to any one of claims 9–13,14 and 18–26.

28. A filter device for a fluidised bed system for separating particles larger than a separating grain from an amount of particles in a fluid flow, the filter device comprising a housing and at least one filter portion sized and configure for separating the particles based upon the size of the particles, wherein a part of the housing is mounted for rotational movement, and the filter portion is provided in the housing and movable upon rotation of the housing, wherein the housing is detachably arranged in a filter holder means, and wherein an open space is defined between the housing and the filter holder means, to which open space fluid pressure is provided which constitutes a fluid pressure seal between the housing and the filter holder means.

29. The filter device according to claim 28, wherein the width of the open space is varied by means of an adjuster clement provided adjacent to the filter holder means.

* * * * *

UNITED STATES PATENT AND TRADEMARK OFFICE
CERTIFICATE OF CORRECTION

PATENT NO. : 6,619,484 B1  
DATED : September 16, 2003  
INVENTOR(S) : Håkan Glad It is certified that error appears in the above-identified patent and that said Letters Patent is hereby corrected as shown below:

Column 6,
Line 41, "particle s" should read -- particles --.
Line 53, "port on" should read -- portion --.
Line 59, "member" should read -- members --.
Line 61, "tite" should read -- the --.

Column 7,
Lines 17-18, "movements" should read -- movement --.
Line 31, "potion" should read -- portion --.
Line 33, "rain" should read -- grain --.
Line 41, "claim 1" should read -- claim 9 --.

Column 8,
Line 1, "claimed 18" should read -- claim 18 --.
Line 2, delete ")".
Line 26, "claim 26" should read -- claim 25 --.
Line 32, "claims 9-13, 14, and 18-26" should read -- claims 9-13, 14, and 15-26 --.
Line 36, "configure" should read -- configured --.
Line 50, "clement" should read -- element --.

Signed and Sealed this

Tenth Day of February, 2004

JON W. DUDAS
*Acting Director of the United States Patent and Trademark Office*